(12) United States Patent
Lee

(10) Patent No.: US 10,920,086 B2
(45) Date of Patent: Feb. 16, 2021

(54) METHOD FOR OXIDIZING A CARBON BLACK AND A METHOD FOR PREPARING THE CARBON BLACK USING THE SAME

(71) Applicant: OCI COMPANY LTD., Seoul (KR)

(72) Inventor: Jae-Seok Lee, Seongnam-si (KR)

(73) Assignee: OCI COMPANY LTD., Seoul (KR)

( * ) Notice: Subject to any disclaimer, the term of this patent is extended or adjusted under 35 U.S.C. 154(b) by 110 days.

(21) Appl. No.: 16/203,952

(22) Filed: Nov. 29, 2018

(65) Prior Publication Data
US 2019/0161621 A1 May 30, 2019

(30) Foreign Application Priority Data
Nov. 29, 2017 (KR) .......... 10-2017-0161399

(51) Int. Cl.
C09C 1/56 (2006.01)
C09C 1/50 (2006.01)
C09C 1/58 (2006.01)
C09C 1/60 (2006.01)

(52) U.S. Cl.
CPC ............. *C09C 1/565* (2013.01); *C09C 1/50* (2013.01); *C09C 1/58* (2013.01); *C09C 1/60* (2013.01)

(58) Field of Classification Search
CPC ....................................... C09C 1/565
See application file for complete search history.

(56) References Cited

U.S. PATENT DOCUMENTS 6,123,759 A * 9/2000 Mise ............. C09C 1/565
106/31.9
6,471,933 B1 * 10/2002 Dotson ........... C09C 1/565
423/449.1

* cited by examiner

Primary Examiner — Stuart L Hendrickson
(74) Attorney, Agent, or Firm — Hauptman Ham, LLP

(57) ABSTRACT

The present invention relates to a method for oxidizing a carbon black which can prevent or alleviate change in the surface oxidation degree of the carbon black by a residual ozone after surface oxidation reforming, and a method for preparing the carbon black by comprising it in a single continuous process.

9 Claims, 1 Drawing Sheet

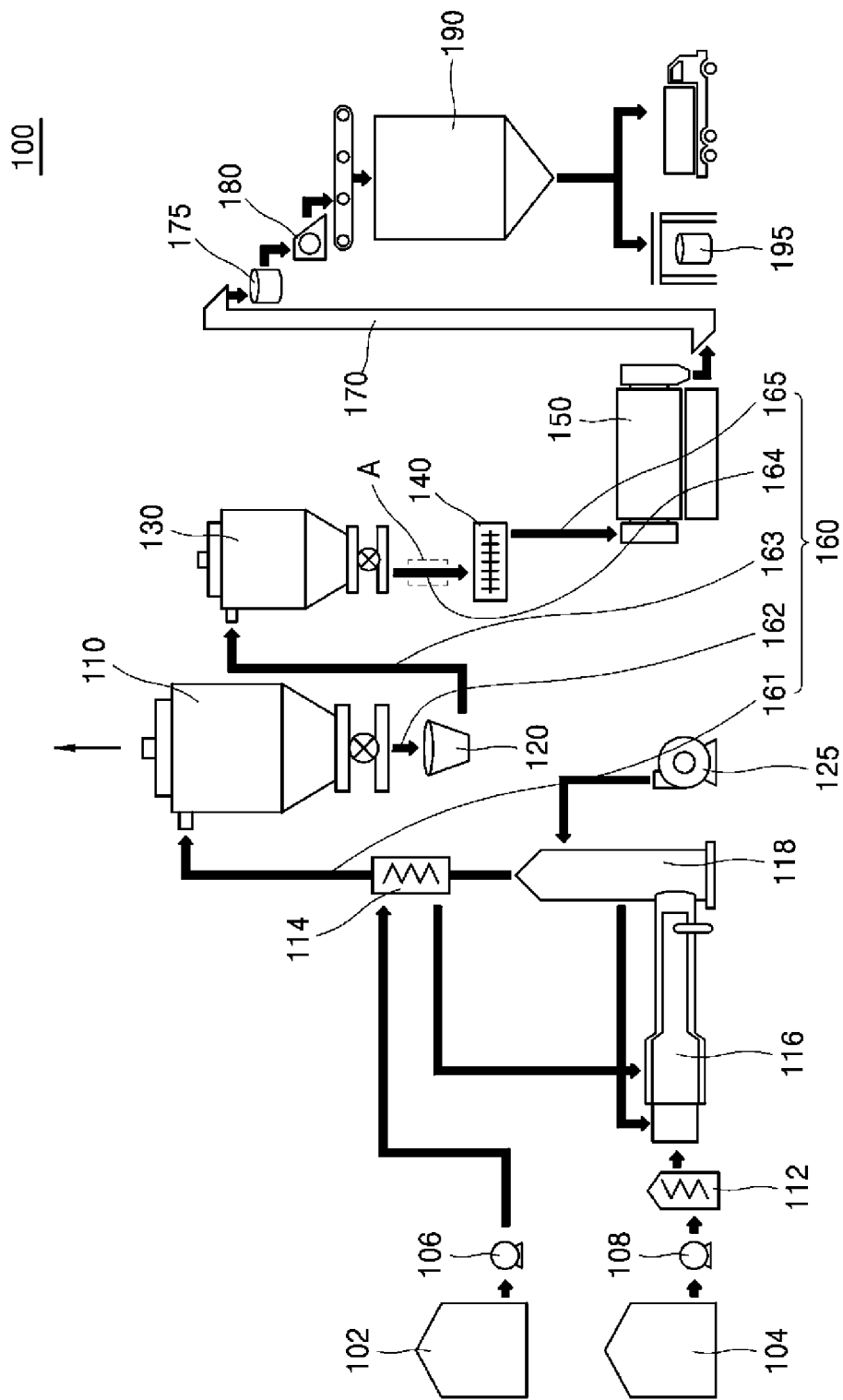

METHOD FOR OXIDIZING A CARBON BLACK AND A METHOD FOR PREPARING THE CARBON BLACK USING THE SAME

CROSS-REFERENCE TO RELATED APPLICATIONS

This application claims the priority of Korean Patent Application No. 10-2017-0161399 filed on Nov. 29, 2017 in the Korean Intellectual Property Office, the disclosure of which is hereby incorporated by reference in its entirety.

TECHNICAL FIELD

The present invention relates to a method for oxidizing a carbon black which can prevent or alleviate change in the surface oxidation degree of the carbon black by a residual ozone after surface oxidation reforming, and a method for preparing the carbon black by comprising it in a single continuous process.

TECHNICAL BACKGROUND OF INVENTION

A carbon black refers to aggregates of very fine spherical particles obtained by incomplete combustion of various hydrocarbons or compounds containing a carbon. The carbon black forms primary particles in a reaction furnace, and these primary particles are fused together to form aggregates in the form of grapevine clusters.

In case that the carbon black which is originally hydrophobic should be used in combination with other hydrophilic materials in various applications, it needs to be reformed into a hydrophilic material. For example, the hydrophilic-reformed carbon black may be considered in dispersibility in an aqueous solution when it is used to applications such as inks, paints, and the like.

There is a method of introducing a functional group to the surface of the carbon black in order to reform it to be hydrophilic. Typically, such method includes a wet oxidation treatment method and a dry oxidation treatment method. For example, while the wet oxidation treatment method is the process of introducing a functional group to the surface of the carbon black by oxidizing it with a nitric acid solution, the dry oxidation treatment method is the process of reacting the carbon black with an activated ozone gas to introduce a functional group to the surface thereof.

In this case, the nitric acid solution or the ozone gas remaining in the carbon black after the oxidation treatment is completed may act as the factor that changes the surface oxidation degree of the carbon black.

DISCLOSURE OF INVENTION

Problem to be Solved

The present invention is aimed to provide a method for oxidizing a carbon black which can prevent or alleviate change in the surface oxidation degree of the carbon black by an ozone gas remaining on the carbon black after a dry oxidation treatment for hydrophilic modification of the carbon black is completed.

Further, it is another purpose of the present invention to provide a method for preparing a carbon black through a single continuous production process without separate process by applying the oxidation method for carbon black as described above to the existing production process of carbon black. The carbon black prepared in accordance with the present method has characteristics which can prevent or alleviate change in the surface oxidation degree thereof after completion of the oxidation treatment as well as during storage of the carbon black,

Means for Solving the Problems

According to an aspect of the present invention, there is provided a method for oxidizing a carbon black, comprising the steps of: (a) generating ozone from oxygen in an ozone generator to obtain a mixed gas of oxygen and ozone, (b) introducing the mixed gas into an oxidation reactor having each of an inlet and an outlet to oxidize the carbon black in the oxidation reactor, (c) discharging the mixed gas through the outlet in the oxidation reactor, and (d) purifying the ozone remaining in the oxidized carbon black.

Further, according to another aspect of the present invention, there is provided a method for preparing a carbon black, comprising; transferring a carbon black produced in a combustion reactor to an oxidation reactor, and then oxidizing the carbon black by the above-described method.

Effect of Invention

According to the present invention, it is possible to prevent or alleviate change in the surface oxidation degree of a carbon black by the ozone gas remaining in the carbon black after completion of the dry oxidation treatment for modifying the carbon black to be hydrophilic, thereby exactly matching the target pH of the produced carbon black.

Further, according to the present invention, it is possible to prevent or alleviate change in the surface oxidation degree of the carbon black after the completion of the oxidation treatment as well as during storage of the produced carbon black by carrying out the process for removing ozone gas remaining in the carbon black.

Furthermore, according to the present invention, since it is also possible to prevent a change in surface oxidation degree of the oxidized carbon black through a single continuous production process without performing a separate process, the present invention is advantageous in terms of process difficulty and process cost.

DETAILED DESCRIPTION OF INVENTION

To facilitate a better understanding of the present invention, certain terms are defined herein for the purpose of convenience. Unless otherwise defined herein, the scientific and technical terms used herein may have the meaning as commonly appreciated by a person who has an ordinary skill in the art.

Also, unless the context clearly indicates otherwise, the singular form of the term may include plural forms thereof, and plural forms of terms may include singular form thereof.

FIG. 1 is a schematic view showing an apparatus for preparing a carbon black wherein an oxidization method and a preparation method of a carbon black is carried out according to an embodiment of the present invention.

Referring to FIG. 1, an apparatus 100 for preparing a carbon black according to an embodiment of the present invention includes a first reactor 110, a crusher 120, a second reactor 130, a pelletizer 140, a drier 150, and a transfer pipe 160.

In the first reactor 110, finely pulverized carbon black is formed by pyrolysis through the reaction of a fuel hydrocarbon and an oxygen-containing gas.

The apparatus 100 for preparing the carbon black may further comprise a first fuel storage tank 102, a first pump 106 and a first preheater 114 to supply the fuel hydrocarbon to the interior of the first reactor 110. In this case, the fuel hydrocarbon stored in the first fuel storage tank 102 is pumped by the first pump 106 to be supplied to the first preheater 114, and the fuel hydrocarbon supplied to the inside of the first preheater 114 is preheated together with the oxygen-containing gas to be supplied to the inside of the first reactor 110.

In addition, the apparatus 100 for preparing the carbon black may further comprise a second fuel storage tank 104, a second pump 108, a second preheater 112, a gas reactor 116, a third preheater 118 and an air blower 125 to supply the oxygen-containing gas to the interior of the first reactor 110.

In this case, a raw material oil is stored in the second fuel storage tank 104, and is pumped by the second pump 108 and supplied to the second preheater 112 to be preheated. Thereafter, the raw material oil is supplied to and passed through the inside of the gas reactor 116, and is supplied to the third preheater 118, wherein the raw material oil is reacted with an oxygen which is injected into the third preheater 118 through the air blower 125 to produce an oxygen-containing gas. Then, the oxygen-containing gas is supplied to the interior of the first preheater 114, preheated together with the fuel hydrocarbons, and then supplied to the interior of the first reactor 110.

The crusher 120 serves to pulverize the carbon black formed by the first reactor 110. By this crusher 120, the carbon black can be pulverized to a fine size of 100 nm or less.

The second reactor 130 is mounted for the purpose of reacting the carbon black pulverized by the crusher 120 with water to form a carbon black mixture. To this end, the second reactor 130 may be provided with a water supply pipe (not shown in the drawing) for receiving water from the outside. The water may be added in an amount of 50 to 300 parts by weight, based on 100 parts by weight of the carbon black mixture, but is not limited thereto.

The pelletizer 140 pelletizes the carbon black mixture formed by the second reactor 130 to form pelletized carbon black.

The dryer 150 dries the pelletized carbon black formed by the pelletizer 140. In this case, the drying is preferably carried out at a temperature of at least 100° C., more preferably 150 to 300° C., in order to remove water from the pelletized carbon black.

The transfer pipe 160 connects the first reactor 110, the crusher 120, the second reactor 130, the pelletizer 140, and the drier 150. More specially, the transfer pipe 160 includes a first transfer pipe 161 connecting the outlet of the first preheater 114 and an inlet of the first reactor 110, a second transfer pipe 162 connecting the outlet of the first reactor 110 and the inlet of the crusher 120, a third transfer pipe 163 connecting the outlet of the crusher 120 and the inlet of the first reactor 130, a fourth transfer pipe 164 connecting the outlet of the second reactor 130 and the inlet of the pelletizer 140, and a fifth transfer pipe 165 connecting the outlet of the pelletizer 140 and the inlet of the dryer 150.

Particularly, the fourth transfer pipe 164, which is the transfer pipe connecting the outlet of the second reactor 130 and the inlet of the pelletizer 140, includes an oxidation reactor.

In this fourth transfer pipe 164, an ozone oxidation reaction is performed on the surface of the pelletized carbon black.

Meanwhile, the apparatus 100 for preparing the carbon black may further include a bucket elevator 170, a classifier 175, a magnetic separator 180, and a storage tank 190. The bucket elevator 170 serves to vertically lift and transport the dried and pelletized carbon blacks. The classifier 175 serves to classify the pelletized carbon blacks vertically raised through the bucket elevator 170 and the magnetic separator 180 serves to separate the classified pelletized carbon blacks.

The storage tank 190 is mounted for the purpose of forming a back filler 195 by heat treating the pelletized carbon blacks separated by the magnetic separator 180. In this case, the back filler 195 formed by heat treatment in the storage tank 190 may be loaded on a transportation means after the quality inspection thereof and be shipped.

Hereinafter, a method for oxidizing a carbon black and a method for preparing the same according to an embodiment of the present invention, which is performed in the oxidation reactor provided in the fourth transfer pipe 164, will be described in detail.

According to an aspect of the present invention, there is provided a method for oxidizing a carbon black, comprising the steps of: (a) generating ozone from oxygen in an ozone generator to obtain a mixed gas of oxygen and ozone, (b) introducing the mixed gas into an oxidation reactor having each of an inlet and an outlet to oxidize the carbon black in the oxidation reactor, (c) discharging the mixed gas through the outlet in the oxidation reactor, and (d) purifying the ozone remaining in the oxidized carbon black.

Herein, the step (a) is a process of producing ozone used as an oxidizing agent for the carbon black.

When an oxygen supplier supplies oxygen to the ozone generator, ozone is generated from oxygen in the ozone generator, and the generated ozone is supplied to the oxidation reactor in a gas state mixed with oxygen.

In the ozone generator, for example, ozone can be generated through plasma discharge such as high voltage arc discharge using air or oxygen separated from compressed air with a compressor as a main raw material.

Another example for generating ozone may be a silent discharge such as a corona discharge. In case of being carried out by the plasma discharge, if a high voltage (6 kV to 15 kV) is applied to the electrodes while sandwiching dielectrics such as glass or ceramics between electrodes and blowing air or oxygen into them, ozone is generated in the discharge space by the following reaction:

$$O_2 + e^- \rightarrow O + O + e^-$$

$$O_2 + e^- \rightarrow O_2^* + e^-$$

$$O + O_2 + M \rightarrow O_3 + M \text{ (M is carbon black)}$$

$$O_2^* + O_2 \rightarrow O_3 + O$$

When ozone is generated in the ozone generator, it is obtained as a gas in the mixed state of ozone and oxygen, and oxygen in the mixed gas is fed as a carrier gas into a reactor together with ozone.

The carbon black is charged into the oxidation reactor in advance before the mixed gas produced in the step (a) is introduced. In this case, in order to uniformly react ozone in the carbon black and the mixed gas, it is preferable to supply the carbon black so as to occupy a volume not more than ½ out of the total volume of the carbon black.

The step (b) is a process of oxidizing the surface of the carbon black by reacting the carbon black in the oxidation reactor with the ozone in the mixed gas introduced into the oxidation reactor.

The input rate of the mixed gas may be controlled to prevent the carbon black from being blown out due to the flow speed of the gas upon introduction of the mixed gas into the oxidation reactor.

In addition, the concentration and the input volume per hour of the mixed gas can be adjusted depending on the bulk density of the carbon black in the oxidation reactor.

Specifically, the mixed gas may be introduced at a concentration of 15 $g/m^3$ to 200 $g/m^3$, and the input rate may be adjusted depending to the size of the oxidation reactor. For example, the mixed gas may be charged to the oxidation reactor at a rate of 0.5 L/min to 5 L/min, based on of 2.5 L of the oxidation reactor. In another example, the mixed gas may be introduced into the oxidation reactor at a rate of 5 L/min to 50 L/min, based on 70 L of the oxidation reactor. It is possible to increase the oxidation efficiency of the carbon black by introducing the mixed gas at the inflow rate within the above-mentioned numerical range.

The oxidizing reactor used for the oxidation of the carbon black herein has an inlet and an outlet, wherein a mixed gas is introduced into the inlet and is discharged through the outlet after completion of the oxidation treatment of the carbon black. For example, if the oxidation reactor is implemented as a cylindrical barrel, the inlet and the outlet may be provided on both sides of the barrel.

When the mixed gas is introduced into the oxidation reactor, it comes into contact with the carbon black previously injected in a batch type in the oxidation reactor.

The ozone in the mixed gas reacts with the carbon black so that the surface of the carbon black is reformed to become hydrophilic and is reduced with oxygen and discharged through the outlet.

In this case, the surface reforming of the carbon black is a step for introducing a polar functional group capable of interrupting the transfer of electrons to the surface of the carbon black.

Examples of the polar functional group include, but are not limited thereto, an amino group, a halogen group, a sulfonic group, a phosphonic group, a phosphoric group, a thiol group, an alkoxy group, an amide group, an aldehyde group, a ketone group, a carboxyl group, an ester group, a hydroxyl group, an acid anhydride group, an acyl halide group, a cyano group and an azole group.

However, the oxidation treatment of step (b) herein is the oxidation treatment using ozone, and the polar functional group introduced into the surface of the carbon black through step (b) may be an oxygen-containing functional group.

The pH of the carbon black before the oxidation treatment in step (b) may be about 9.0 to 10.0, but is not essentially limited thereto, and the pH of the carbon black may be controlled to fall outside the above range depending on the preparation process of the carbon black as the raw material. However, in general, the pH of the carbon black before the oxidation treatment may have a pH adjacent to basic rather than neutral (7.0).

The carbon black may have a pH closer to acid than neutral (7.0) by oxidation treatment of step (b), and may have a pH of preferably 5 or less, more preferably 3 or less.

Subsequently, after the oxidation treatment of the carbon black is completed, the mixed gas remaining in the oxidation reactor is removed through an outlet provided in the oxidation reactor (step (c)).

In this case, the mixed gas discharged from the outlet of the oxidation reactor mainly includes oxygen contained in the mixed gas as a carrier gas and oxygen generated from the ozone after reacting with the carbon black. A residual ozone that has not reacted with the carbon black can also be discharged from the oxidation reactor through the outlet.

Further, according to the present invention, the step (d) of purging ozone remaining in the oxidized carbon black after the step (c) may be additionally performed.

The step (d) is a process of purging a gas, which is independently performed with and is distinct from the step (c), which removes the mixed gas in the oxidation reactor after the oxidation treatment of the carbon black is completed.

Specifically, the step (d) is the process for removing ozone as an oxidizing gas remaining on the carbon black, not for removing the gas mixture forming the gas atmosphere in the oxidation reactor.

In the case of the carbon black, in general, primary particles are present as aggregates in the form of grapevine clusters fused to each other. Even if the mixed gas is discharged from the oxidation reactor after oxidation treatment of the carbon black, a small amount of ozone may remain in the pores in the aggregates of the carbon black, the pores in the space between the aggregates, or the like.

Although the ozone remaining in the above pores exists in trace amounts, it may act as a factor for changing the surface oxidation degree of the carbon black. For example, the residual ozone during the storage of the oxidized carbon black as well as the carbon black after the oxidation treatment enables additional oxidation reaction to the carbon black.

In addition, there is a possibility that the oxidation degree of the carbon black may be measured to be greater by ozone remaining in the pores in the aggregates of the carbon black, the pores in the space between the aggregates, or the like. For example, even though the actual pH of the oxidized carbon black is 3.0, the pH of the carbon black may be measured to be less than 3.0 by ozone remaining in the pores in the aggregates of the carbon black, the pores in the space between the aggregates, or the like.

Therefore, the present invention can either prevent or alleviate change in the oxidation degree of the surface-oxidized carbon black or to prevent the oxidation degree of the carbon black from being measured to be grater due to the residual ozone, by way of additionally carrying out the step (d) of purging the ozone remaining in the carbon black.

In one embodiment, the step (d) may be carried out by introducing an inert purge gas into the oxidation reactor.

The inert purge gas may be at least one selected from nitrogen, argon, helium, and neon. That is, the inert purge gas may be provided as various combinations of gases within a range that does not affect the surface characteristics of the oxidized carbon black.

Further, according to another embodiment of the present invention, the step (d) can be configured so that the ozone remaining in the pores in the aggregates of the carbon black, the pores in the space between the aggregates, or the like is discharged to the outside of the oxidation reactor through the outlet while reducing the pressure in the oxidation reactor.

In addition, by the step (d), the ozone remaining in the pores in the aggregates of the carbon black, the pores in the space between the aggregates, or the like can be more effectively removed by way of rotating the oxidation reactor at a predetermined speed simultaneously with introducing the inert purge gas into the oxidation reactor.

In this case, the oxidation reactor can be rotated at a speed of 3 to 7 rpm. If the rotating speed of the oxidation reactor is less than 3 rpm, that is, if the rotating speed is excessively slow, the effect of improving the bulk density of the carbon black is low due to the rotation of the oxidation reactor, and the effect of removing the ozone remaining in the pores in the aggregates of the carbon black, the pores in the space between the aggregates, or the like may be insufficient.

Further, the step (d) can be carried out while raising the temperature in the oxidation reactor. In this case, the temperature in the oxidation reactor can be raised to 300° C., and the ozone remaining in the pores in the aggregates of the carbon black, the pores in the space between the aggregates, or the like can be removed in pyrolysis by the temperature elevation of the oxidation reactor.

According to another embodiment of the present invention, the step (d) may be carried out in a screw feeder which transports the oxidized carbon black to other process unit. Herein, the other process unit may be a pelletizer for pelletizing the carbon black or a drier for drying the carbon black. The screw feeder means a device for transferring the carbon black entered into a hopper on one side of a cylindrical transfer pipe to the other side thereof by a screw installed in the transfer pipe. The screw feeder is a feeder equipped with a uniaxial-screw or a biaxial-screw, and can increase the bulk density of the carbon black conveyed by rotation of the screw feeder, whereby it is possible to physically remove the ozone remaining in the pores in the aggregates of the carbon black, the pores in the space between the aggregates, or the like.

Also, the step (d) can be performed while raising the temperature in the screw feeder. In this case, the temperature in the screw feeder may be raised to 300° C., and the ozone remaining in the pores in the aggregates of the carbon black, the pores in the space between the aggregates, or the like can be removed in pyrolysis by the temperature elevation of the oxidation reactor.

According to this embodiment, in terms of the fact that the screw feeder is the transfer means for connecting the oxidation process unit and the subsequent process unit without the need to remove the residual ozone by extracting the oxidized carbon black and transferring it to a separate reactor and that the residual ozone in the carbon black can be removed in the screw feeder, It is possible to ensure the continuity of the process.

As a result of the step of removing the residual ozone in the carbon black, the change in pH of the carbon black measured after the completion of the step (d) compared to pH of the carbon black measured after the completion of the step (b) is less than 0.2, or the rate of change in pH is 5% or less.

Further, according to another aspect of the present invention, there is provided a method of preparing a carbon black wherein the carbon black produced in a combustion reactor is transferred to an oxidation reactor, and then oxidized by the above-described method.

In the present invention, the carbon black can be produced by heat treatment after a raw material oil, a fuel oil and a combustion-promoting gas are injected into a combustion reactor.

The fuel oil is the one burned to reach a high temperature which can correspond to the reaction conditions for producing the carbon black and may include one of those selected from the groups consisting of a liquid fuel such as a diesel, a kerosene, a bunker C oil, a petroleum-based FCC, EBO, a creosote, a soft pitch, a coal-based coal tar, a naphthalene, a carboxylic acid, FCC and the likes, a gaseous fuel such as a natural gas and a coal gas, and a combination thereof.

The raw material oil is a substance that forms a seed of the carbon black and may include one of those selected from the groups consisting of a liquid raw material such as a gasoline, a diesel, a kerosene, a bunker C oil, a petroleum-based FCC, EBO, a creosote, a soft pitch, a coal-based coal tar, a naphthalene, a carboxylic acid, FCC and the likes, a gaseous raw material such as a natural gas and a coal gas, and a combination thereof.

The combustion-promoting gas may be, for example, an air or an oxygen.

The carbon black prepared by the above can be transferred from a combustion reactor to an oxidation reactor and be oxidized in the oxidation reactor through the steps (a) to (d) described above.

As described above, a method capable for preventing or alleviating change in the surface oxidation degree of the carbon black due to the ozone gas remaining in the carbon black after the completion of the dry oxidation treatment for the hydrophilic modification of the carbon black is applied to the existing continuous process for preparing the carbon black, whereby it is possible to keep the surface oxidation degree of the carbon black constant without performing any separate process.

Hereinafter, specific embodiments of the present invention will be described. It is to be understood, however, that the following examples is to illustrate or explain the present invention only, but is not intended to limit it.

A Method for Preparing a Carbon Black

Example 1

After a device having a combustion reactor and an oxidation reactor connected to the combustion reactor was prepared, 50 kg of N234 grade carbon black was produced in the combustion reactor. Creosote was used as a raw material oil and a petroleum-based FCC and an air were used as a fuel oil. The feed rate of the raw material oil was set to 2,800 kg/hr, the feed rate of the fuel oil was set to 250 kg/hr, and the feed rate of the air was set to 4,560 Nm$^3$/hr.

50 g of the produced carbon black was transferred to an oxidation reactor, and a mixed gas containing ozone and oxygen was supplied at a rate of 1 L/min so that the concentration of ozone became 84 g/m$^3$, and oxidation treatment was carried out for 2 hours.

After the oxidation treatment, the mixed gas in the oxidation reactor was discharged, and a mixed gas of a nitrogen and an argon was introduced into the oxidation reactor at a rate of 0.5 L/min and purged for 1 hour. In this case, the temperature in the oxidation reactor was kept at a room temperature.

Example 2

A carbon black was prepared in the same manner as in Example 1, except that the oxidation reactor was rotated at a speed of 3 rpm when nitrogen was purged.

Example 3

A carbon black was prepared in the same manner as in Example 1, except that the oxidation reactor was rotated at a speed of 5 rpm when nitrogen was purged.

Example 4

A carbon black was prepared in the same manner as in Example 1, except that the oxidation reactor was rotated at a speed of 7 rpm when nitrogen was purged.

Example 5

A device having a combustion reactor and an oxidation reactor connected to the combustion reactor was prepared, and then 50 kg of N234 grade carbon black was produced in the combustion reactor. Creosote was used as a raw material oil and a petroleum-based FCC and an air were used as a fuel oil. The feed rate of the raw material oil was set to 2,800 kg/hr, the feed rate of the fuel oil was set to 250 kg/hr, and the feed rate of the air was set to 4,560 $Nm^3/hr$.

50 g of the produced carbon black was transferred to an oxidation reactor, and a mixed gas containing ozone and oxygen was supplied at a rate of 1 L/min so that the concentration of ozone became 84 $g/m^3$, and oxidation treatment was carried out for 2 hours.

After the oxidation treatment, the mixed gas in the oxidation reactor was discharged, and the oxidation reactor was rotated at a speed of 3 rpm for 1 hour. In this case, the temperature in the oxidation reactor was maintained under an elevated temperature to 300° C.

Example 6

A carbon black was prepared in the same manner as in Example 5, except that the temperature in the oxidation reactor was raised to 350° C.

Example 7

A device having a combustion reactor and an oxidation reactor connected to the combustion reactor was prepared, and then 50 kg of N234 grade carbon black was produced in the combustion reactor. Creosote was used as a raw material oil and a petroleum-based FCC and an air were used as a fuel oil. The feed rate of the raw material oil was set to 2,800 kg/hr, the feed rate of the fuel oil was set to 250 kg/hr, and the feed rate of the air was set to 4,560 $Nm^3/hr$.

50 g of the produced carbon black was transferred to an oxidation reactor, and a mixed gas containing ozone and oxygen was supplied at a rate of 1 L/min so that the concentration of ozone became 84 $g/m^3$, and oxidation treatment was carried out for 2 hours.

After the oxidation treatment, the mixed gas in the oxidation reactor was discharged, and the oxidized carbon black was supplied to the uniform occlusal type of a counter-rotating twin screw feeder at a rate of 10 kg/hr. The screw in the screw feeder was operated at a speed of 7 rpm and the temperature in the screw feeder was maintained under an elevated temperature to 300° C.

Example 8

A carbon black was prepared in the same manner as in Example 7, except that the temperature in the screw feeder was raised to 350° C.

Comparative Example 1

A carbon black was prepared in the same manner as in Example 1, except that after the oxidation treatment followed by discharge of the mixed gas from the oxidation reactor, no subsequent treatment was carried out.

Comparative Example 2

A carbon black was prepared in the same manner as in Comparative Example 1, except that after the oxidation treatment followed by discharge of the mixed gas from the oxidation reactor, the oxidation reactor is rotated at 5 rpm for 1 hour under the normal temperature condition.

Evaluation of the Surface Oxidation Degree of a Carbon Black

The surface oxidation degree of each of the carbon blacks prepared in Examples and Comparative Examples (immediately after the oxidation treatment, immediately after the preparation of the carbon black is completed, and 24 hours after the preparation of the carbon black is completed) was measured according to ASTM D1512, and the results thereof were shown by the following Table 1.

TABLE 1

| Classification | pH value measured before oxidation treatment of ozone | pH value measured immediately after oxidation treatment of ozone | pH value measured 24 hours after oxidation treatment of ozone |
|---|---|---|---|
| Example 1 | 9.2 | 2.7 | 2.76 |
| Example 2 | 9.2 | 2.7 | 2.75 |
| Example 3 | 9.2 | 2.7 | 2.74 |
| Example 4 | 9.2 | 2.7 | 2.72 |
| Example 5 | 9.2 | 2.7 | 2.74 |
| Example 6 | 9.2 | 2.7 | 2.72 |
| Example 7 | 9.2 | 2.7 | 2.73 |
| Example 8 | 9.2 | 2.7 | 2.72 |
| Comparative Example 1 | 9.2 | 2.7 | 2.92 |
| Comparative Example 2 | 9.2 | 2.7 | 2.87 |

Referring to the result of Example 1, it can be confirmed that, when an inert gas is purged in the oxidation reactor after the oxidation treatment followed by discharge of the mixed gas from the oxidation reactor, the residual ozone in the carbon black is removed, whereby the change rate of the pH value measured 24 hours after the oxidation treatment of ozone is small. Further, referring to the results of Examples 2 to 4, when the oxidation reactor is rotated simultaneously with purging with the inert gas, the bulk density of the carbon black in the oxidation reactor is improved to enable the additionally physical removal of the residual ozone in the carbon black, whereby it is possible to keep the pH change rate of the carbon black even smaller.

Further, referring to the results of Examples 5 to 8, after the oxidation treatment followed by discharge of the mixed gas from the oxidation reactor, the bulk density of the carbon black is improved by rotating the screw in the oxidation reactor or the screw feeder under the elevated temperature. At the same time, it is possible to keep the pH change rate of the carbon black even smaller through the physical removal of the residual ozone in the carbon black and the pyrolysis of the ozone.

On the other hand, referring to the results of Comparative Example 1 and Comparative Example 2, it is understood that, when no subsequent treatment is carried out, except that the oxidation reactor is rotated after the oxidation treatment followed by discharge of the mixed gas from the oxidation reactor, the residual ozone in the carbon black Is not effectively removed, whereby the pH change rate of the carbon black is relatively large.

As illustrated according to the embodiments of the present invention, it will be apparent to a person who has an ordinary knowledge in the art that various corrections and modifications of the present invention by addition, change or deletion of the constitutive components may be made without departing from the spirit of the invention, as set forth in the appended claims. The above modifications and corrections can be also said to be fallen within the scope of the present invention.

What is claimed is:

1. A method for oxidizing a carbon black, comprising the steps of:
   (a) generating ozone from oxygen in an ozone generator to obtain a mixed gas of oxygen and ozone;
   (b) introducing the mixed gas into an oxidation reactor having each of an inlet and an outlet to oxidize a carbon black in the oxidation reactor;
   (c) discharging the mixed gas through the outlet in the oxidation reactor; and
   (d) removing the ozone remaining in the oxidized carbon black,
   wherein the step (d) is carried out by introducing an inert purge gas into the oxidation reactor.

2. The method for oxidizing the carbon black according to claim 1, wherein the change in pH of the carbon black measured after the completion of the step (d) compared to pH of the carbon black measured after the completion of the step (b) is less than 0.2, or the rate of change in pH is 5% or less.

3. The method for oxidizing the carbon black according to claim 1, wherein the inert purge gas is at least one selected from a nitrogen, an argon, a helium and a neon.

4. The method for oxidizing the carbon black according to claim 1, wherein the step (d) is carried out by raising the temperature in the oxidation reactor.

5. The method for oxidizing the carbon black according to claim 4, wherein the step (d) is carried out by raising the temperature in the oxidation reactor to 300° C. or more.

6. The method for oxidizing the carbon black according to claim 1, wherein the step (d) is carried out by rotating the oxidation reactor.

7. The method for oxidizing the carbon black according to claim 1, wherein the step (d) is carried out in a screw feeder for transferring the oxidized carbon black.

8. The method for oxidizing the carbon black according to claim 7, wherein the step (d) is carried out by raising the temperature in the screw feeder to 300° C. or more.

9. A method for preparing a carbon black, comprising the steps of:
   (a) producing a carbon black in a combustion reactor;
   (b) transferring the carbon black produced in the combustion reactor to an oxidation reactor; and
   (c) generating ozone from oxygen in an ozone generator to obtain a mixed gas of oxygen and ozone;
   (d) introducing the mixed gas into the oxidation reactor having each of an inlet and an outlet to oxidize the carbon black in the oxidation reactor;
   (e) discharging the mixed gas through the outlet in the oxidation reactor; and
   (f) removing the ozone remaining in the oxidized carbon black,
   wherein the step (f) is carried out by introducing an inert purge gas into the oxidation reactor.

* * * * *